United States Patent [19]

Yokouchi et al.

[11] Patent Number: 4,796,211

[45] Date of Patent: Jan. 3, 1989

[54] WATCHDOG TIMER HAVING A RESET DETECTION CIRCUIT

[75] Inventors: Hiroshi Yokouchi; Makoto Mogi, both of Tokyo, Japan

[73] Assignee: Oki Electric Industry Co., Ltd., Tokyo, Japan

[21] Appl. No.: 947,681

[22] Filed: Dec. 30, 1986

[30] Foreign Application Priority Data

Jan. 13, 1986 [JP] Japan ................................. 61-4714

[51] Int. Cl.$^4$ ............................................ G06F 11/08
[52] U.S. Cl. ...................................... 364/569; 371/62
[58] Field of Search ............................ 364/569; 371/62

[56] References Cited

U.S. PATENT DOCUMENTS

| | | | |
|---|---|---|---|
| 4,618,953 | 10/1986 | Daniels et al. | 371/62 X |
| 4,627,057 | 12/1986 | Schmidt et al. | 371/25 |
| 4,701,758 | 10/1987 | Dunkerton et al. | 340/825.48 |
| 4,705,970 | 11/1987 | Turnpaugh | 371/62 X |

FOREIGN PATENT DOCUMENTS 3225712 12/1984 Fed. Rep. of Germany .
229888 11/1985 German Democratic Rep. .

Primary Examiner—Parshotam S. Lall
Assistant Examiner—Edward R. Cosimano
Attorney, Agent, or Firm—Spencer & Frank

[57] ABSTRACT

In a watchdog timer comprising a reset data detection circuit for detecting input reset data and outputting a reset signal, and a first counter that outputs a carry signal unless, before its count overflows, it receives a reset signal from said reset data detection circuit, the rest data detection circuit comprises a latch circuit for latching said reset data, a second couner for counting the number of times a said reset signal is generated, and a comparator for comparing the output data from the latch circuit and the second counter and outputting the reset signal when the output data from the latch circuit and the outputting the reset signal match.

11 Claims, 5 Drawing Sheets

WATCHDOG TIMER HAVING A RESET DETECTION CIRCUIT

BACKGROUND OF THE INVENTION

This invention relates to a watchdog timer included in a data processing unit, such as a central processing unit (CPU) or microprocessor unit (MPU).

A CPU or MPU is generally designed to run correctly if programmed correctly, but such devices occasionally malfunction due to external noise, aging of circuit elements, and other causes. For that reason they are provided with watchdog timers.

Examples of the prior art in this field are given on (1) page 31 of the *Shin Maikon Yogo Jiten* (New Microcomputer Dictionary) published by the Electronic Device Group of Nippon Electric Co., Ltd. (1984-3-30) and (2) page 2-21 to page 2-22 of the *Microcontroller Handbook* published by Intel Corp. (1985). The prior art is explained below with reference to these two examples.

The example of the prior art watchdog timer described in the literature (1) comprises a presettable counter with an overflow function, the counter being built in the CPU. The CPU is programmed so as to execute processing for a given time, then preset the counter, so if the program is executed normally the timer will not overflow. If the CPU malfunctions, the counter is not preset before the expiration of the given time, so that an overflow occurs. Detection of the overflow can be made to cause a nonmaskable interrupt (an interrupt that is always enabled) to notify the outside world (the outside of the CPU) of an error in the CPU, and a suitable interrupt routine can be programmed to handle the error, thereby improving the reliability of the CPU.

The watchdog timer described in the literature (2) comprises a 16-bit up-counter that prevents the CPU from running out of control. The watchdog timer is initialized by writing the data 1EH to it. Next the 1's complement of 1EH, which is OE1H, is written to enable the counter, which commences free-run counting. During operation, if the 1EH and 0E1H data are successively written to the watchdog timer within 16ms (at 12 MHz), the watchdog timer resets and starts counting again from 0. To reset the watchdog timer, in other words, a combination of fixed data must be written in succession to the watchdog timer within a fixed time.

If the combination of the data to reset the watchdog timer is not written within the fixed time, the watchdog timer generates a carry signal. The carry signal resets the CPU, causing it to restart program execution from address O. This prevents "runaway" of the CPU, i.e., prevents the CPU from continuing to execute a program that has gone out of control.

A problem with the above watchdog timers is their inability to prevent program runaway accurately. This is because there is a certain probability that a runaway program resets the watchdog timer by writing the data identical (by chance) to those defined for resetting, so that the runaway is not detected.

SUMMARY OF THE INVENTION

An object of the invention is to provide a watchdog timer that solves the problem of the inaccuracy of the prior art in detecting program runaway.

According to the invention, there is provided a watchdog timer comprising a reset data detection circuit for detecting input reset data and outputting a reset signal, and a first counter that outputs a carry signal unless, before its count overflows, it receives a reset signal from said reset data detection circuit, wherein said reset data detection circuit comprises:

a latch circuit for latching said reset data, a second counter for counting the number of times a said reset signal is generated, and a comparator for comparing the output data from said latch circuit and said second counter and outputting said reset signal when the output data from said latch circuit and the output data from said second counter match.

Due to the above-described configuration of the watchdog timer, the data that must be inputted to the latch circuit in order to produce the counter reset signal that resets the first counter is updated by the second counter that counts the number of times the counter reset signal is generated. The probability that a runaway program writes or repeats writing the data required for resetting the first counter is smaller. As a result, program runaway can be detected with improved accuracy, eliminating the problem described above.

DETAILED DESCRIPTION OF THE PREFERRED EMBODIMENTS

Figure 1:
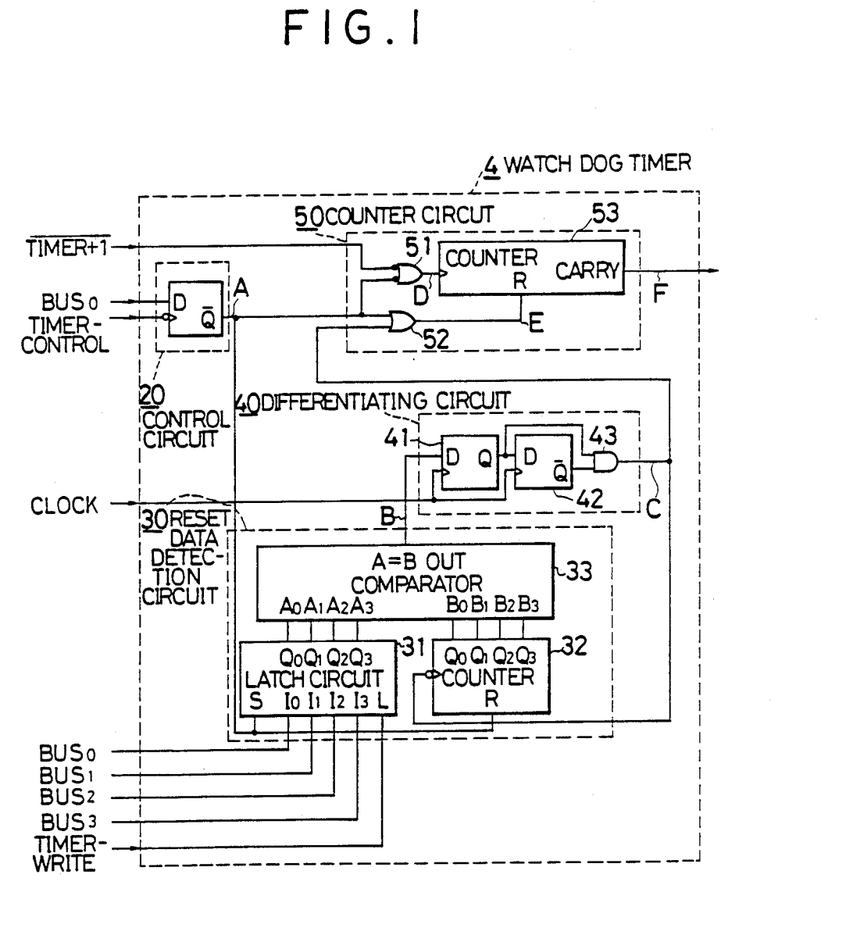
FIG. 1 is a block diagram showing a watchdog timer of an embodiment of the invention.
Figure 2:
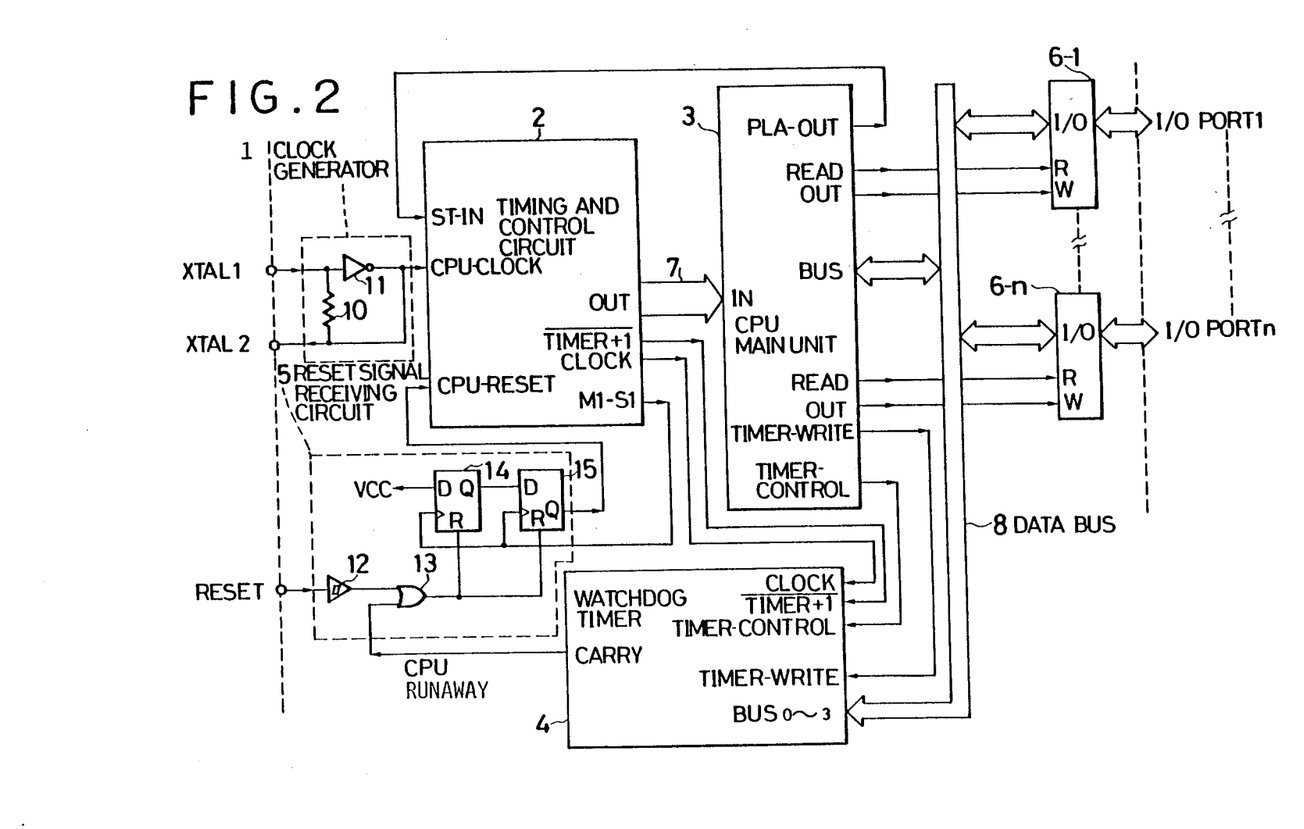
FIG. 2 is a block diagram showing an example of a CPU including the watchdog timer of FIG. 1.

FIG. 1 is a block diagram of a watchdog timer of an embodiment of the present invention. FIG. 2 is a block diagram showing a CPU incorporating the watchdog timer of FIG. 1.

The CPU in FIG. 2 is provided with a clock generator circuit 1, a timing and control circuit 2, a CPU main unit 3, a watchdog timer 4, a reset signal receiving circuit 5, and a number of input/output (I/O) ports 6-1 to 6-n. The timing and control circuit 2 is connected to the CPU main unit 3 by its output signal lines 7, and to the watchdog timer 4 and the reset signal receiving circuit 5. The CPU main unit 3, the watchdog timer 4, and the I/O ports 6-1 to 6-n are connected to a data bus 8 over which they communicate with each other.

The clock generator 1, which is connected to two terminals XTAL1 and XTAL2 and to the timing and control circuit 2, comprises a resistor 10 and inverter 11. The clock signal CPU CLOCK is output from the inverter 11 to the timing and control circuit 2.

The timing and control circuit 2 generates timing and control signals. It has input pins for a status input signal ST.IN, a clock signal CPU.CLOCK, and a reset signal CPU.RESET and output pins for an output signal OUT, a $\overline{\text{TIMER}+1}$ signal, a clock signal CLOCK, and a M1.S1 signal. The timing and control signals output from these output pins are fed to the CPU main unit 3 via the output signal lines 7, and to the watchdog timer 4 and the reset signal receiving circuit 5.

The CPU main unit 3 comprise an instruction register, an accumulator, other registers, an arithmetic and logic (ALU) unit, a data memory (RAM), and other components. It has input pins marked IN connected to the output signal lines 7, and output pins for output of the programmable logic array (instruction decoder) output signal PLA.OUT, a read signal READ, the output signal OUT, a timer write signal TIMER.WRITE, and a timer control signal TIMER.CONTROL, and data signal ST IN input/output pins for a data signal BUS, which are connected to the data bus 8. The PLA.-OUT signal is fed to the timing and control circuit 2 as the status signal ST.IN for controlling the timing and control circuit 2. The READ and OUT signals are fed to the input/output ports 6-1 to 6-n, and the TIMER.-WRITE, and the TIMER.CONTROL signals are fed to the watchdog timer 4.

The watchdog timer 4 has input pins for receiving the CLOCK and $\overline{\text{TIMER}+1}$ signals from the timing and control circuit 2, the TIMER.CONTROL and TIMER.WRITE signals from the CPU main unit 3, and the data signals BUS0 to BUS3 from the data bus 8, and an output pin for output of the carry signal CARRY. If a CPU runaway occurs, the watchdog timer outputs the CARRY signal to the reset signal receiving circuit 5.

The reset signal receiving circuit 5 comprises an amplifier circuit 12 connected to the reset pin RESET, an OR gate 13 that generates the logical sum of the carry signal CARRY and the output of the amplifier circuit 12, and flip-flops 14 and 15 connected to the output of the OR gate 13. The flip-flops 14 and 15 are reset by the output of the OR gate 13 and input the supply voltage Vcc when clocked by the M1.S1 signal from the timing and control circuit 2. The CPU reset signal CPU.RESET is thus output at a controlled timing from flip-flop 15 to the timing and control circuit 2.

The input/output (I/O) ports 6-1 to 6-n are controlled by the CPU main unit 3 and mediate the transfer of data between the data bus 8 and the external input/output pins I/O PORT1 to I/O PORTn.

In the above configuration, driven by the timing and control signals from the timing and control circuit 2, the CPU main unit 3 performs various operations, according to the program and the results of the operations. If a CPU runaway occurs, the watchdog timer 4 detects this and outputs a carry signal CARRY which is converted by the reset signal receiving circuit 5 into the reset signal CPU RESET. The reset signal CPU.RESET halts the operation of the timing and control circuit 2, thereby preventing the CPU's runaway.

As shown in FIG. 1, the watchdog timer 4 comprises a control circuit 20, a reset data detection circuit 30, a differentiating circuit 40 that wave-shapes the reset signal output from the circuit 30, and a counter circuit 50.

The control circuit 20 comprises a flip-flop, the D input of which is the BUS0 signal on the data bus 8 in FIG. 2, this input being latched upon generation of the timer control signal TIMER.CONTROL output from the CPU main unit 3 as a write strobe. The $\overline{Q}$ output of this flip-flop is fed via signal line A to the reset data detection circuit 30 and the counter circuit 50, and controls the starting and stopping of the watchdog timer. The watchdog timer operates when signal A is at the 0 level and stops when signal A is at the 1 level.

The reset data detection circuit 30 comprises a latch circuit 31 that holds the watchdog timer's reset data, a second counter 32 that counts the number of times the watchdog timer resets, and a comparator 33 that compares the output data from the latch circuit 31 and the output data from the second counter 32 and produces a counter reset signal upon finding the coincidence (match) between the two inputs.

The set signal S of the latch circuit 31 is the signal A from the control circuit 20 and its inputs I0 to I3 are the BUS0 to BUS3 signals on the data bus 8 in FIG. 2. It has input pins for latching these inputs when strobed at pin L by the write signal TIMER.WRITE from the CPU main unit 3, and output pins for feeding the latch output signals Q0 to Q3 to the comparator 33. When the latch circuit 31 receives the timer write signal TIMER.WRITE (at the 1 level), it inputs the data signals BUS0 to BUS3 from the data bus 8 and latches these signals when the TIMER.WRITE signal goes to the 0 level. When the latch circuit 31 inputs the timer stop signal A (at the 1 level) from the control circuit 20, it initializes and outputs 1-level signals from all of its outputs Q0 to Q3 to the comparator 33.

The second counter 32 is clocked by the reset signal C sent from the differentiating circuit 40. It has an input pin for receiving the reset signal C as its clock signal, an input pin for receiving the signal A from the control circuit 20 as its reset signal R, and output pins for sending the counter output signals Q0 to Q3 to the comparator 33. Each time the reset signal C is received, the second counter 32 increments by 1. When the timer stop signal A is input (at the 1 level), the second counter initializes and their output signals Q0 to Q3 to the comparator 33 become all 0.

The comparator 33 has input pins for receiving the output signals Q0 to Q3 from the latch circuit 31 as input signals A0 to A3 and for receiving the output signals Q0 to Q3 from the second counter 32 as input signals B0 to B3. It also has an output pin OUT for output of a coincidence signal on signal line B to the differentiating circuit 40. The comparator compares the data sent from the latch circuit 31 and second counter 32 and, when this data is equal (A=B), outputs the coincidence signal B (at the 1 level) to the differentiating circuit 40.

The differentiating circuit 40 comprises edge-triggered flip-flops 41 and 42 and a two-input AND gate 43. Clocked by the clock signal CLOCK supplied by the timing and control circuit 2 in FIG. 2, this circuit performs digital differentiation of the coincidence signal B output from the comparator 33 and outputs from the AND gate 43 the counter reset signal C, which is fed to the second counter 32 and the counter circuit 50. The second counter 32 thereby counts the number of times of generation of the signal C.

The counter circuit 50 comprises a two-input NOR gate 51 for count input control, a two-input OR gate 52 for reset input control and the first counter 53. The two-input NOR gate 51 takes the logical product of the inverses of the $\overline{\text{TIMER}+1}$ signal output from the timing and control circuit 2 in FIG. 2 and the signal A from the control circuit 20 and feeds the resulting output signal D as the clock signal to the first counter 53. The output signal D is output when the signal A is at the 0 level. The two-input OR gate 52 takes the logical sum of the signal A and the reset signal C and feeds the resulting output signal E to the first counter 53 as the reset signal to the reset pin R. The first counter 53 increments by 1 each time the signal D is input in the timer mode (while the watchdog timer is running), and the count value increases until the signal E is input. The signal E, output from the OR gate 52 when the reset signal C is input to the OR gate 52, resets the count, which starts again from 0. If the output signal E is not received until the first counter 53 overflows, the carry signal CARRY is output via line F to the reset receiving circuit 5 in FIG. 2.

Next the operation of the watchdog timer 4 is described with reference to the timing charts of FIGS. 3 and 4. In these figures, M1 represents the CPU's machine cycle and S1, S2, and S3 are states within this cycle, each state lasting for three clock pulses. TIMER Q0 to TIMER Qn give the count value of the first counter 53.

Figure 3:
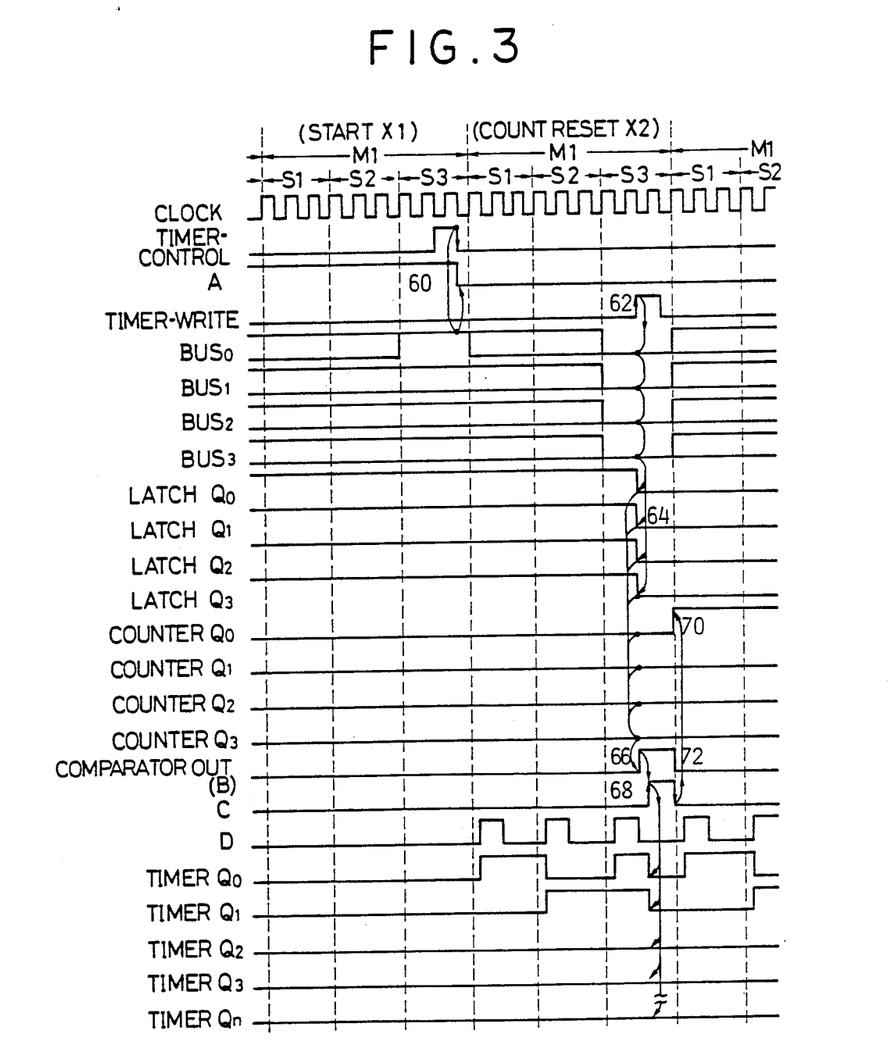
FIGS. 3 and 4 are time charts showing the signals which appear in different states of the watchdog timer of FIG. 1.

Briefly, the first M1 machine cycle (x1) in FIG. 3 is for initializing and starting the watchdog timer and takes place when the system is started.

After the initilization and the start-up, the watchdog timer begins operating. When the watchdog timer is operating, the counter 53 counts the time by incrementing by 1 every state i.e., once during each state S1 to S3 of each machine cycle.

When the CPU continues to operate properly (under proper, expected control), the counter 53 is reset before it overflows, and starts counting up from 0 again, and such counting and resetting (before overflow) are repeated. When the CPU is out of control, the counter 53 is not reset (or, to be more exact, such resetting may occur by chance but will not be repeated) before overflow, so that the carry signal CARRY is generated and the CPU will be reset and begins executing the program from the address 0. The machine cycle (x2) in FIG. 3 and the machine cycle (x4) in FIG. 4 show by way of example how the first counter 53 is successfully reset, while the machine cycle (x3) in FIG. 4 is an example in which the resetting fails.

Although the machine cycle (x2) is shown to be contiguous to the machine instruction execution cycles (x1), there are in fact other machine cycle between them which are for execution of the instructions of the program.

Similarly, although the machine cycle (x4) is shown to be contiguous to the machine cycle (x3), in fact either one of the cycles (x3) and (x4) actually takes place. The cycle (x3) or (x4) takes place after a successful resetting with the data in the counter 32 being 0000 as at (x2) in FIG. 3. During (x3) or (x4) the reset data detection is made with the data in the counter 32 being 1000 for Q0 to Q3. When the resetting is successful as at (x4), the counter 32 is incremented and becomes ready for the next detection reset data, whose value is 0100 for Q0 to Q3 inputs of the latch circuit 31.

Figure 5:
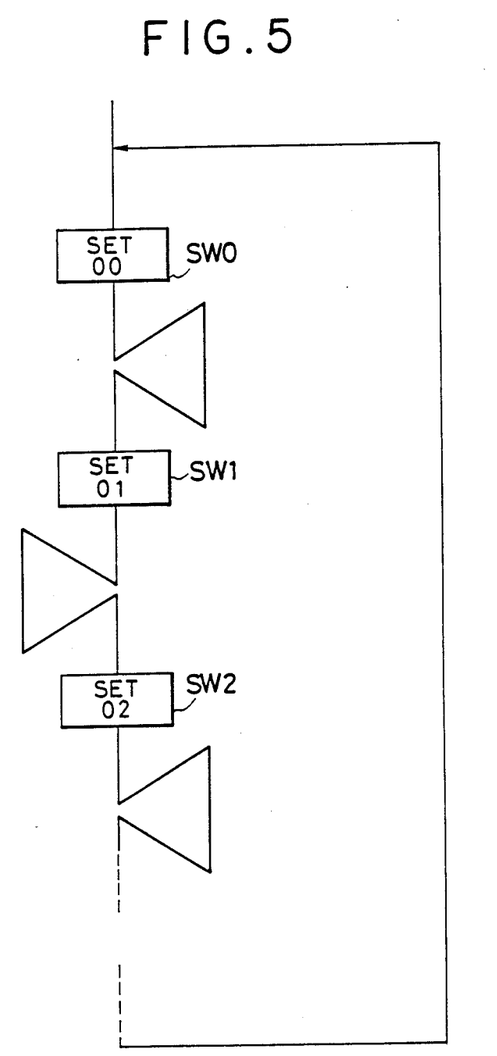
FIG. 5 is a schematic diagram showing a program that a CPU may have to operate in cooperation with the watchdog timer of FIG. 1.

The watchdog timer can be used in conjunction with a CPU containing a program as schematically shown in FIG. 5. As illustrated, the program includes steps SW0, SW1, SW2, SW3, . . . for writing reset data into the latch circuit 31. The step SW0 is for writing OOH. The step SW1 is for writing O1H. The step SW2 is for writing O2H. Thus the value of the date written by the successive writing steps is successively incremented. This is in conformity with the count-up by the counter 32 which increments by 1 each time the reset data is written in the latch circuit 31 and has been found to match the contents in the counter 32 and the counter 53 is successfully reset.

(1) The Watchdog Timer's Starting Cycle

In states S1 to S3 of the first M1 machine cycle (x1) in FIG. 3 the watchdog timer is in the stopped mode and the signal A from the control circuit 20 is at the 1 level. This signal A is fed to the latch circuit 31 and the counter 32 of the reset data detection circuit 30, and via the OR gate 52 of the counter circuit 50 to the first counter 53. The signal A functions as the set signal S of the latch circuit 31, the reset signal R of the second counter 32, and the reset signal R of the first counter 53, causing the latch circuit output signals Q0 to Q3 to be at the 1 level, the Q0 to Q3 outputs of the counter 32 to be at the 0 level, and the count values TIMER Q0 to Qn of the first counter 53 all to be 0.

In the latter half of the S3 state of the first M1 machine cycle, generally indicated by numeral 60, the TIMER.CONTROL signal fed to the control circuit 20 changes from 0 to 1, then from 1 to 0, at which time the 1 level of data signal BUS0 is input to the control circuit 20, causing its output signal A to change from 1 to 0.

(2) The Watchdog Timer's Count Reset Cycle

When the signal A changes from 1 to 0 the watchdog timer is enabled and enters the watchdog timer mode, starting from state S1 of the second M1 machine cycle (x2) in FIG. 3. In this mode the first counter 53 increments by 1 every state.

In state S3 of the second M1 machine cycle, generally indicated by numeral 62, when the write signal TIMER.WRITE furnished to the latch circuit 31 changes from 0 to 1, the 0000 values of the data signals BUS0 to BUS3 output on the data bus 8 in FIG. 2 are input to the latch circuit 31, which latches them when the TIMER WRITE signal changes from 1 to 0, causing the latch circuit output signals Q0 to Q3 to change from 1111 to 0000, generally indicated by number 64.

When the latch circuit output signals Q0 to Q3 are all 0, they match the 0000 values of the second counter outputs Q0 to Q3, so the OUT output signals B of the comparator 33 changes from 0 to 1, generally indicated by numeral 66. The signal B is latched in the differentiating circuit 40 on the rising edge of the master clock signal CLOCK. The differentiating circuit 40 outputs the reset signal C at the 1 level for one pulse period of the master clock signal CLOCK, generally indicted by numeral 68.

The reset signal C is input to the OR gate 52 of the counter circuit 50 and resets the first counter 53. When the reset signal changes from 1 to 0, the first counter 53 begins counting again from 0. Also, since the reset signal C is the clock input of the second counter 32, the 1-to-0 transition of the reset signal C increments the second counter 32 by 1, changing the second counter output signals Q0 to Q3 from 0000 to 1000, generally indicated by numeral 70.

After the second counter 32 increments, the A0 to A3 inputs of the comparator 33 are 0000 while the B0 to B3 inputs are 1000. Since these two inputs no longer match, the comparator output signal B changes from 1 to 0, generally indicated by numeral 72. This completes the resetting of the watchdog timer.

Thereafter, the first counter 53 increments by 1 every state S1, S2, . . . until the reset signal C becomes 1. The reset signal C is produced if the data 1000 identical to those in the counter 32 are written in the latch circuit 31. If the reset signal C is not generated before the counter 53 overflows, the counter 53 generates the carry signal CARRY which resets the CPU, and the CPU begins executing again from address O.

(3) Unsuccessful Reset Cycle

When the CPU attempts to reset the first counter 53, and if it writes data differing from the contents of the second counter 32 to the latch circuit 31, the following operation ensues.

Figure 4:
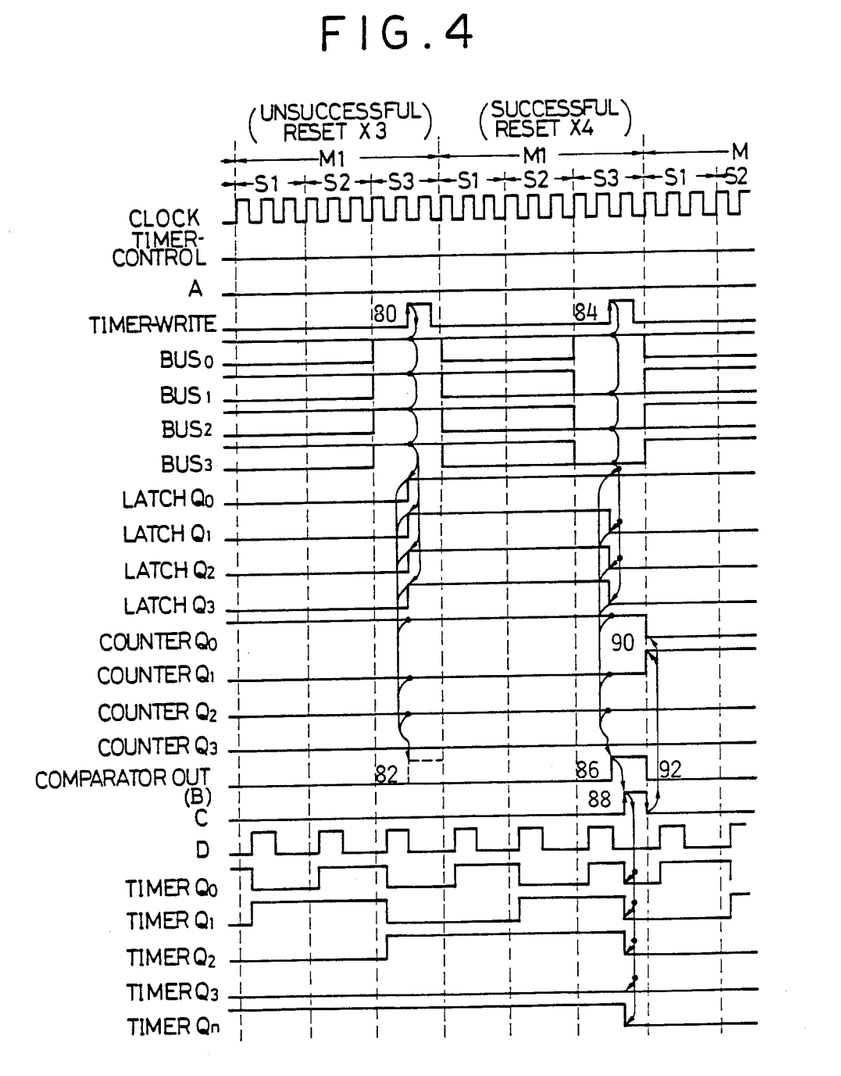

When the write signal TIMER.WRITE changes from 0 to 1, generally indicated by numeral 80, in state S3 of the first M1 machine cycle (x3) in FIG. 4, the data signals BUS0 to BUS3, e.g., 1111, different from the data in the counter 32 are input to the latch circuit 31. The latch circuit 31 latches this data when the write signal TIMER.WRITE changes from 1 to 0. The A0 to A3 input signals of the comparator 33 then change from 0000 to 1111, while the other input signals B0 to B3 remain 1000. Both before and after the transition of the A0 to A3 inputs, the two sets of inputs to the comparator 33 are unequal, so the output signal B remains 0, generally indicated by numeral 82. Since the differentiating circuit 40 does not output the reset signal C, the first counter 53 continues counting.

It follows that when data other than the value of the second counter 32 are written to the latch circuit 31, the first counter 53 is not reset.

(4) Successsful Reset Cycle

If data, 1000, matching the value of the second counter 32 are written to the latch circuit 31, the following operation ensues.

When the write signal TIMER.WRITE changes from 0 to 1, generally indicated by numeral 84, in state S3 of the second M1 machine cycle (x4) in FIG. 4, the data signals BUS0 to BUS3 1000 are input to the latch circuit 31. When the write signal TIMER.WRITE changes from 1 to 0, this data is latched in the latch circuit 31. The A0 to A3 input signals of the comparator 33 then change from 1111 to 1000, matching the 1000 value of the input signals B0 to B3. The output signal B of the comparator 33 therefore changes from 0 to 1, generally indicated by numeral 86. This causes the differentiating circuit 40 to output the reset signal C at the 1 level, generally indicated by numeral 88, resetting the first counter 53 to the value 0. When the reset signal C changes from 1 to 0, the first counter 53 resumes counting from 0.

The reset signal C is also the clock signal of the second counter 32, so when the reset signal changes from 1 to 0, the second counter 32 increments by 1 and its output signals Q0 to Q3 change from 1000 to 0100, generally indicated by numeral 90. The change in the value of the second counter 32 makes the two sets of inputs A0 to A3 and B0 to B3 of the comparator 33 unequal again, causing its output signal B to change from 1 to 0, generally indicated by numeral 92, thus completing the resetting of the first counter 53.

To reset the watchdog timer it is therefore necessary to write to the latch circuit 31 data matching the value of the second counter 32. Since this value changes each time, the chance that a runaway program will consistently succeed in triggering the watchdog timer's reset signal C is reduced as compared with the prior art, in which no such change takes place. Thus the accuracy with which program runaway can be detected is improved.

In the embodiment described above, the latch circuit 31 and the second counter 32 have a 4-bit data width, but a greater number of bits may be used to improve detection accuracy still further. The second counter 32 was described as incrementing by 1, but another type of up-counter, down-counter, or the like may be used and corresponding circuit modification may be made to the comparator 33. It will also be understood that the control circuit 20, the differentiating circuits 40, and the first counter circuit 50 are not restricted to the circuits shown in the figure, but can be modified in various ways. In addition the device employing the watchdog timer need not be the CPU shown in FIG. 2 but may be a microprocessor or other data processing device.

As described above, the reset data detection circuit in this invention comprises a latch circuit, a counter, and a comparator, and the data required to reset the watchdog timer are dependent on the value of the counter. Thus a number of different reset data can be required for the successive resetting, the number depending on the bit size of the counter. Since the reset data is updated by the counter at each reset, the chance that the watchdog timer is successively (repeatedly) reset by a runaway program is smaller than in the prior art, in which the reset data remain fixed. The ability of the watchdog timer to detect program runaway accurately is therefore greater than in the prior art.

What is claimed is:

1. A watchdog timer comprising a reset data detection circuit for detecting input reset data and outputting a reset signal, and a first counter that outputs a carry signal unless, before its count overflows, it receives a reset signal from said reset data detection circuit, wherein said reset data detection circuit comprises:
   a latch circuit for latching said reset data,
   a second counter for counting the number of times a said reset signal is generated, and
   a comparator for comparing the output data from said latch circuit and said second counter and outputting said reset signal when the output data from said latch circuit and the output data from said second counter match.

2. A watchdog timer according to claim 1, wherein the latch circuit is connected to receive data from a data bus and latches the date upon receipt of a timer write signal which is supplied from the outside.

3. A watchdog timer according to claim 1, wherein the first counter receives and counts clock pulses which are periodically produced.

4. A watchdog timer according to claim 1, wherein the first counter starts counting up from 0 when it is reset.

5. A watchdog timer according to claim 1, further comprising a differentiating circuit receiving the output of the comparator and producing a pulse in synchronism with a clock, and wherein the output of the differentiating circuit is applied to said first counter to reset it and to said second counter to increment it.

6. A combination of a CPU and a watchdog timer, the watchdog timer comprising a reset data detection circuit for detecting input reset data and outputting a reset signal, and a first counter that outputs a carry signal unless, before its count overflows, it receives a reset signal from said reset data detection circuit, wherein said reset data detection circuit comprises:
   a latch circuit for latching said reset data,
   a second counter for counting the number of times said reset signal is generated, and
   a comparator for comparing the output data from said latch circuit and said second counter and outputting said reset signal when the output data from said latch circuit and the output data from said second counter match, and the CPU is programmed to execute instructions for writing reset data into the latch circuit, the data written into the latch circuit correspondingly incrementing by 1 said second counter each time one of said instructions for writing the reset data is executed.

7. The combination according to claim 6, wherein the carry signal from the first counter is used to reset the CPU, whereupon the CPU resets and starts executing its program from address O.

8. A watchdog timer according to claim 6, wherein the latch circuit is connected to receive data from a data bus and latches the data upon receipt of a timer write signal which the CPU produces when it executes one of the instructions for writing the reset data in the latch circuit.

9. A watchdog timer according to claim 6, wherein the first counter receives and counts clock pulses which are periodically produced.

10. A watchdog timer according to claim 6, wherein the first counter starts counting up from 0 when it is reset.

11. A watchdog timer according to claim 6, further comprising a differentiating circuit receiving the output of the comparator and producing a pulse in synchronsim with a clock, and wherein the output of the differentiating circuit is applied to said first counter to reset it and to said second counter to increment it.

* * * * *